United States Patent
Bruner et al.

(10) Patent No.: US 9,851,901 B2
(45) Date of Patent: Dec. 26, 2017

(54) TRANSFER OF OBJECT MEMORY REFERENCES IN A DATA STORAGE DEVICE

(71) Applicant: HGST NETHERLANDS B.V., Amsterdam (NL)

(72) Inventors: Curtis H. Bruner, Niwot, CO (US); Christopher J. Squires, Boulder, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 56 days.

(21) Appl. No.: 14/499,056

(22) Filed: Sep. 26, 2014

(65) Prior Publication Data
US 2016/0092107 A1    Mar. 31, 2016

(51) Int. Cl.
H04L 12/28    (2006.01)
G06F 3/06    (2006.01)

(52) U.S. Cl.
CPC ............ G06F 3/061 (2013.01); G06F 3/0659 (2013.01); G06F 3/0661 (2013.01); G06F 3/0667 (2013.01); G06F 3/0689 (2013.01)

(58) Field of Classification Search
CPC ...... G06F 12/0638; G06F 8/66; G11C 7/1006
See application file for complete search history.

(56) References Cited

U.S. PATENT DOCUMENTS

| | | | |
|---|---|---|---|
| 5,412,666 A | 5/1995 | Squires et al. | |
| 6,202,106 B1 * | 3/2001 | Baxter | G06F 3/14 710/22 |
| 6,266,760 B1 * | 7/2001 | DeHon | G06F 15/8023 712/11 |
| 6,763,437 B1 * | 7/2004 | Nguyen | G06F 3/0613 711/112 |
| 7,219,169 B2 | 5/2007 | Lee et al. | |
| 8,228,728 B1 * | 7/2012 | Yang | G11C 11/5628 365/185.03 |
| 8,244,955 B2 | 8/2012 | Nakamura et al. | |
| 8,386,704 B2 | 2/2013 | Hall | |
| 8,595,434 B2 | 11/2013 | Northcutt et al. | |
| 8,606,978 B2 | 12/2013 | Armstrong | |
| 2005/0144223 A1 * | 6/2005 | Yang | G06F 12/0866 709/203 |
| 2008/0104315 A1 * | 5/2008 | Hall | G06F 3/0613 711/112 |
| 2010/0146068 A1 * | 6/2010 | Haviv | G06F 3/0613 709/212 |
| 2010/0161910 A1 * | 6/2010 | Stall | G06F 9/30189 711/147 |
| 2010/0312973 A1 * | 12/2010 | Galbo | G06F 13/1642 711/154 |

(Continued)

*Primary Examiner* — Ryan Bertram
*Assistant Examiner* — Trang Ta (57) ABSTRACT

Herein are data storage devices to transfer a reference of a data object during a storage operation. These data storage devices include a host controller configured to obtain a reference of an object stored in a shared memory system for writing to a storage media controlled by a drive controller. To the drive controller, the host controller transfers the reference of the object in the memory system. The host controller transfers a storage command to the drive controller to write the object to the storage media. The drive controller may be configured to transfer a reference of an object read into the memory system.

18 Claims, 12 Drawing Sheets

(56) References Cited

U.S. PATENT DOCUMENTS

2013/0061111 A1 3/2013 Sarcone et al.
2014/0337560 A1* 11/2014 Chun .................. G06F 12/0246
711/103

* cited by examiner

FIGURE 12

TRANSFER OF OBJECT MEMORY REFERENCES IN A DATA STORAGE DEVICE

TECHNICAL BACKGROUND

A storage drive includes a non-volatile physical storage media such as a magnetic or optical mechanical disk or a solid state drive. The storage media is operated by a drive controller to read and write data to the media and transfer data to and from drive controller memory. A drive controller may load from firmware and execute an instance of a real time operating system (RTOS).

A network connected drive is deployed on a network, as a server or other similar network attached drive. In addition to providing remote storage, a network connected drive may host a variety of platform services such as a network file system or a distributed data store. To provide these or other additional services, a network connected drive includes a host controller. The host controller and drive controller have separate processors and execute separate operating systems. Typically the host controller and drive controller exist as isolated subsystems residing in separate packages placed on a printed circuit board. Due to execution of separate operating systems that independently allocate memory, the host controller and drive controller generally share neither a memory address space nor a physical memory.

Between the host controller and drive controller is a communication bus, such as a Small Computer System Interface (SCSI) bus, a Serial Attached SCSI (SAS) bus, a Serial ATA (SATA) bus, Fibre Channel, or any other protocol bus for transferring commands and exchanging data objects. Either the host controller or the drive controller may transfer data over the bus, depending on whether the data is read or written. Writing data onto the bus requires copying the data from memory. Reading data off of the bus requires copying the data into memory. For example when writing data, the host controller copies data from a host controller memory onto the bus, and then the drive controller copies the data from the bus into a drive controller memory. As such, dispatching either a write command or a read command requires a data object be copied at least twice, which can increase latency.

OVERVIEW

Examples disclosed herein provide data storage devices to transfer a reference of a data object during storage operation for the object. In one example, a data storage device includes a host controller configured to obtain a reference of an object stored in a shared memory system for writing to a storage media controlled by a drive controller. The host controller transfers the reference of the object to the drive controller. The host controller transfers a storage command to the drive controller to write at least a portion of the object to the storage media. In one example, the drive controller is configured to transfer a reference of an object read into the memory system in fulfillment of a storage command to read an object. In one instance, the drive controller and host controller are integrated within a system-on-chip (SoC). In one example, the drive controller and host controller share a communication bus, such as a small computer system interface (SCSI) bus.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Examples herein are data storage devices having an optimized internal data pathway. Inside each of these data storage devices is a memory system and controllers. Each of the data storage devices herein has a memory system that is shared by the controllers. Because the controllers share the memory system, the controllers may share data objects residing in the memory system by exchanging references of those objects.

Although management of data objects still passes between controllers during operation, this does not require transferring or copying the data. Instead, the passing of data management between controllers occurs by transfer, between controllers, of object references residing in the memory system. The result is operational efficiency along the data pathway within a data storage device. This may achieve device acceleration, reduced power consumption, increased reliability, or other advantages.

An implementation may rely on industry-standard interfaces for internal operation. Herein is an example having a communication bus, such as a SCSI bus, for coordination between controllers. Herein is an example using memory pointers as references of data objects shared between controllers.

Responsibility for allocating memory for referenced data may be configured into a host controller, a drive controller, or both. Which controller is responsible may depend on whether data is being read or written. The controllers execute program instructions to transfer references of data objects and fulfill other responsibilities, such as running an operating system instance.

An implementation may rely on industry-standard interfaces for deployment integration. Deployment in a data center or a personal system is considered herein. Herein are examples having a network or other communication interface. Herein are examples that allow distributed operation, redundancy, and horizontal scalability. Virtualization of networks or operating systems is considered herein. Physical enclosure for aggregating these data storage devices is discussed.

Herein are examples of physical packaging of an individual data storage device. Implementations may have a degree of circuitry integration according to design tradeoffs such as initial cost, marginal cost, and time to market. System-on-chip, system-in-package, and discrete components are considered.

Figure 11:
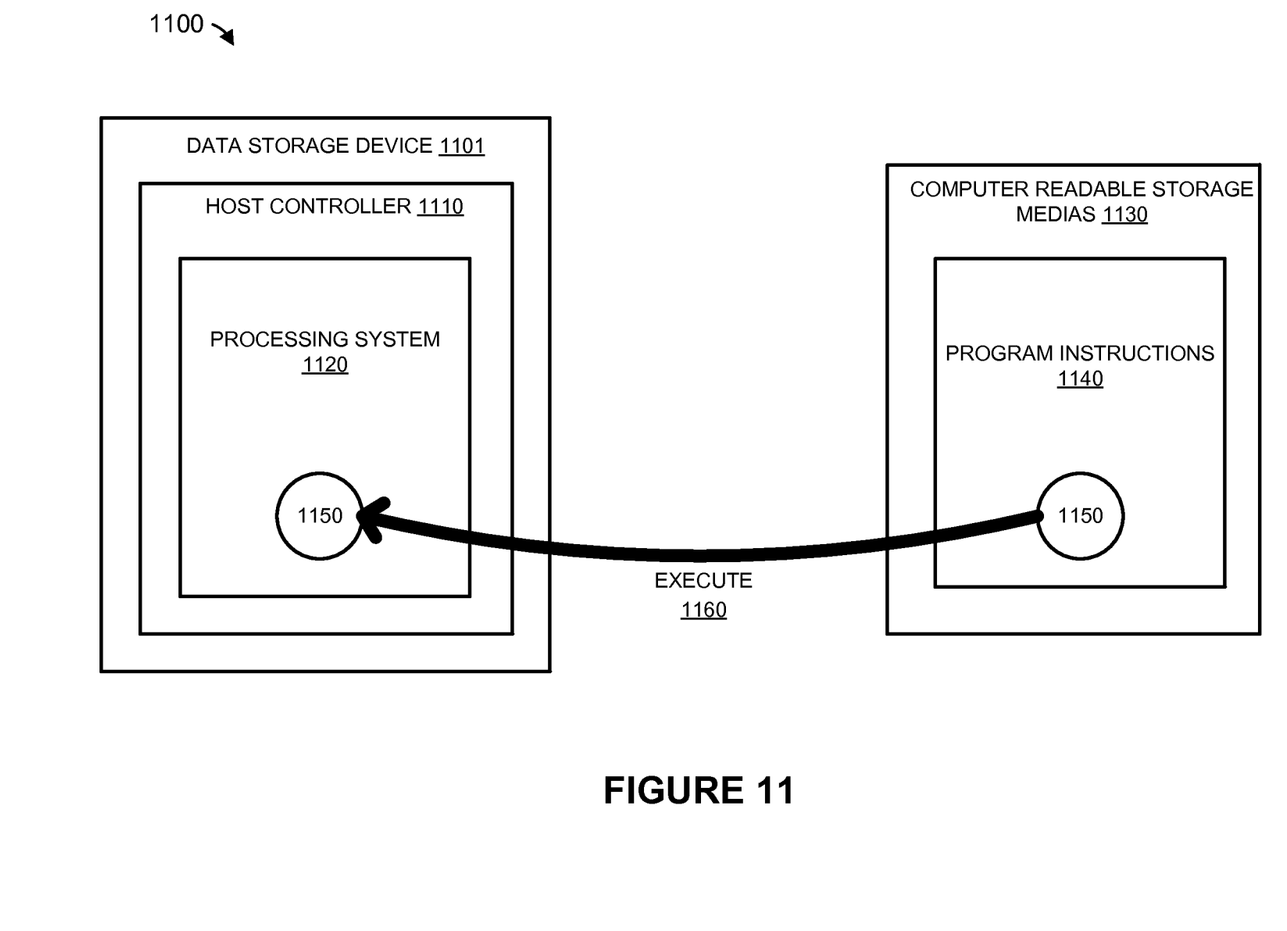
FIG. 11 illustrates a data storage system.
Figure 12:
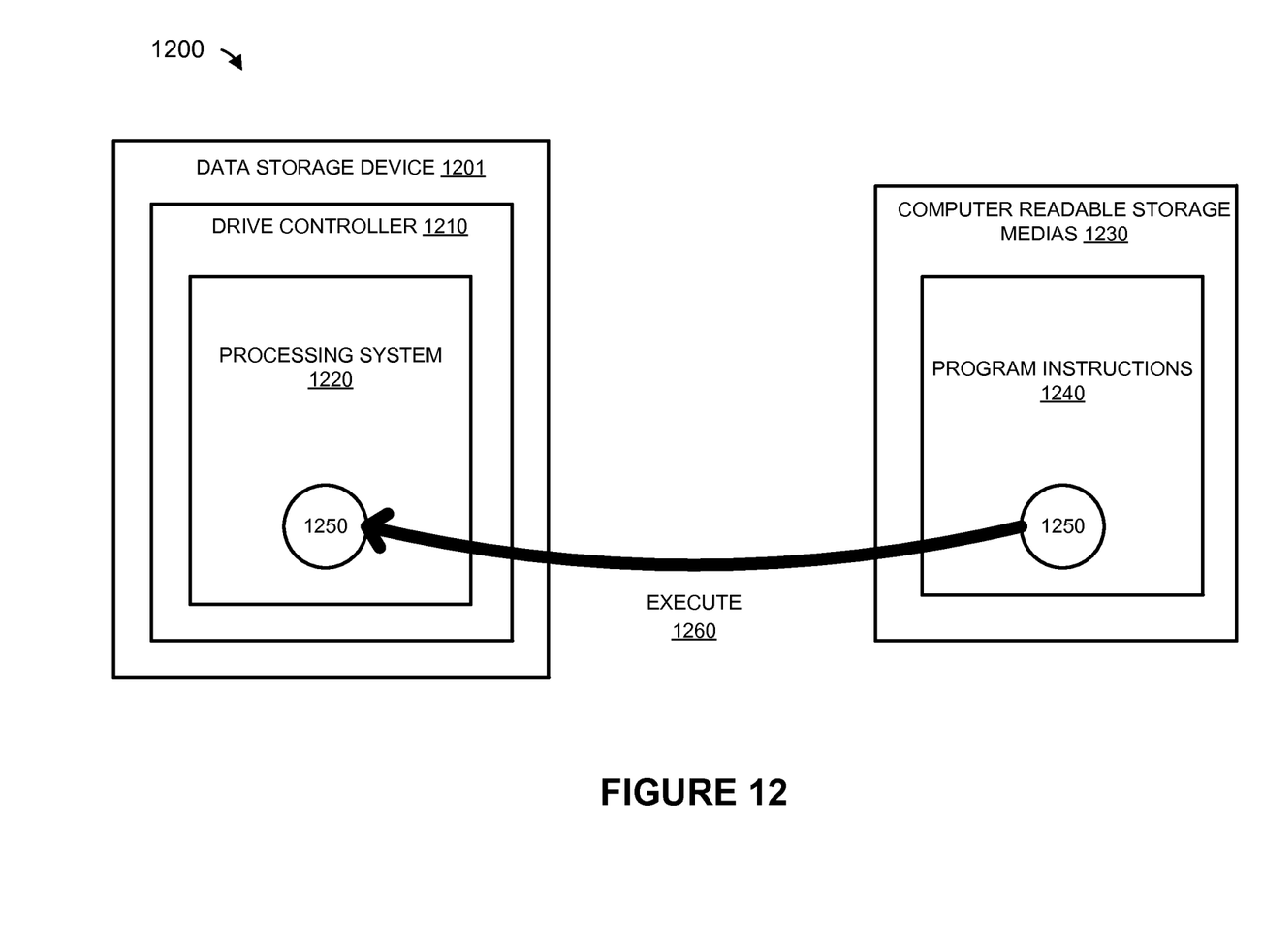
FIG. 12 illustrates a data storage system.

In FIGS. 1-4 some data storage devices and their operation are explained, including transferring data references between controller, other interactions between controllers, and control of an underlying storage media. Physical aggregation of individual data storage devices and physical aggregation of collections of data storage devices are presented in FIG. 5. FIGS. 6-10 present a network connected drive that combines a data storage device and a network interface. Internally this network connected drive uses a data bus, such as SCSI, memory pointers, operating systems, and application process execution. FIGS. 11-12 present architectures for executing program instructions that configure the operation of internal controllers in any implementation herein.

Figure 1:
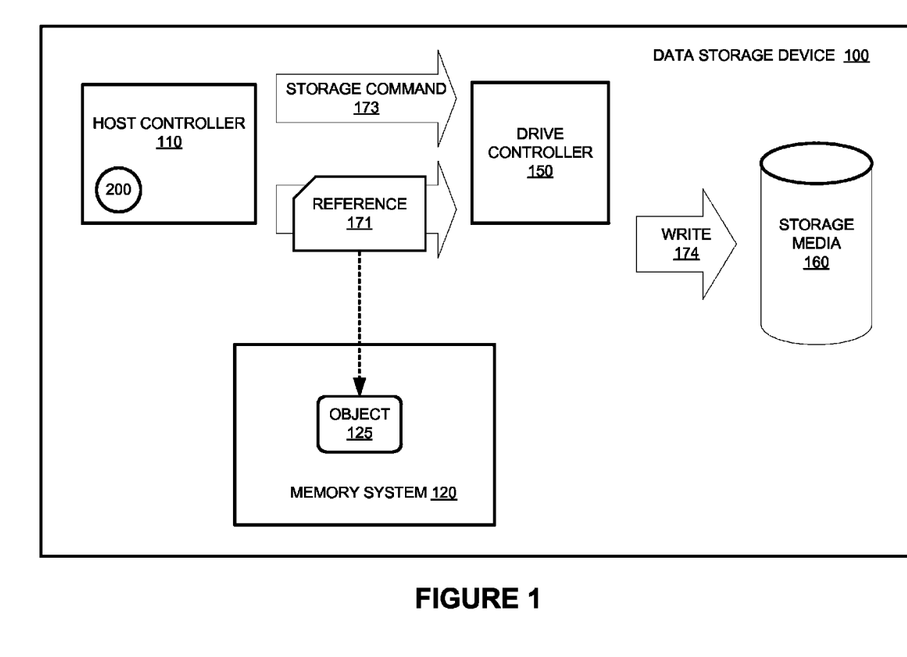
FIG. 1 illustrates a data storage device.

In particular, FIG. 1 illustrates data storage device 100 that transfers a reference of an object between controllers before writing the object to a storage media. Data storage device 100 may be deployed wirelessly, in a server, in a personal system, or in any hardware environment needing data storage. Data storage device 100 includes host controller 110, drive controller 150, storage media 160, and memory system 120.

Memory system 120 may be any memory unit or aggregation of units that update and retain objects as addressable data for later retrieval, such as a random access memory (RAM) chip, dynamic random access memory (DRAM), on-chip memory, or other memory device. Host controller 110 and drive controller 150 are connected to memory system 120. Objects stored in memory system 120 are accessible by host controller 110 and drive controller 150.

Host controller 110 may be an embedded computer that executes an instance of an operating system, such as Linux. Host controller 110 may execute additional software to facilitate caching, quality of service, replication, federation, or other platform services.

Drive controller 150 may be an embedded computer that executes an instance of a real time operating system (RTOS). Drive controller 150 controls storage media 160. Storage media 160 may be any non-volatile online storage media, such as a magnetic or optical mechanical disk or a solid state drive.

Object 125 may be digital data, such as a byte sequence, a block, a structure, a text string, or a file. Object 125 may contain application data, a record, a multimedia object, executable code, a log, or other digital data item capable of being transferred, stored, and retrieved. A software application, a physical device, manual data entry, or other means may have created object 125. So long as object 125 is not too small, object 125 may be divided into smaller data objects. Likewise object 125 may have originally been assembled from smaller data objects.

Figure 2:
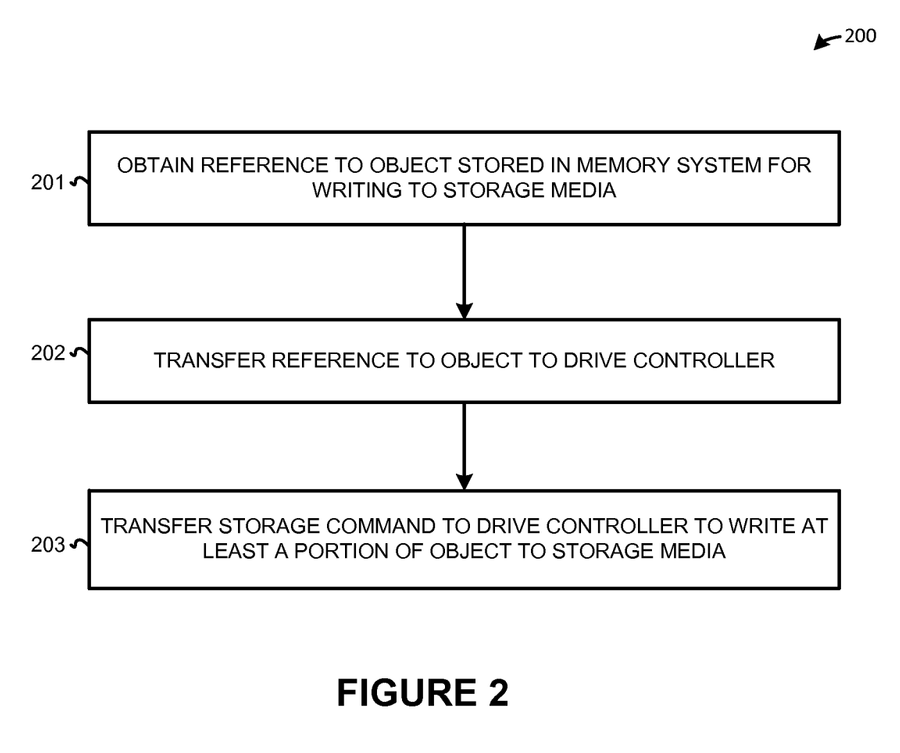
FIG. 2 illustrates a process executed by a host controller.

In operation, object 125 is written to storage media 160. To facilitate this action, host controller 110 executes process 200. Host controller 110 has reference 171 to object 125 in memory system 120. Reference 171 may be a pointer, an address, a handle, an array offset, a queue index, an associative key, or other identifier that can be dereferenced to access object 125 in memory system 120. Host controller 110 transfers reference 171 to drive controller 150. Host controller 110 also transfers storage command 173 to drive controller 150. Storage command 173 directs drive controller 150 to write object 125 to storage media 160, shown as write 174.

FIG. 2 illustrates the sequence of steps that host controller 110 performs while executing process 200 to transfer reference 171 of object 125 to drive controller 150 and then have object 125 written to storage media 160. Initially, host controller 110 obtains (201) reference 171 of object 125 stored in memory system 120 for writing to storage media 160. Earlier object 125 may have been transferred into memory system 120 for storage from an external system. Host controller 110 transfers (202) reference 171 of object 125 to drive controller 150. Host controller 110 transfers (203) storage command 173 to drive controller 150 to write at least a portion of object 125 to storage media 160. In some examples, step 203 may occur prior to or simultaneously to step 202.

Figure 3:
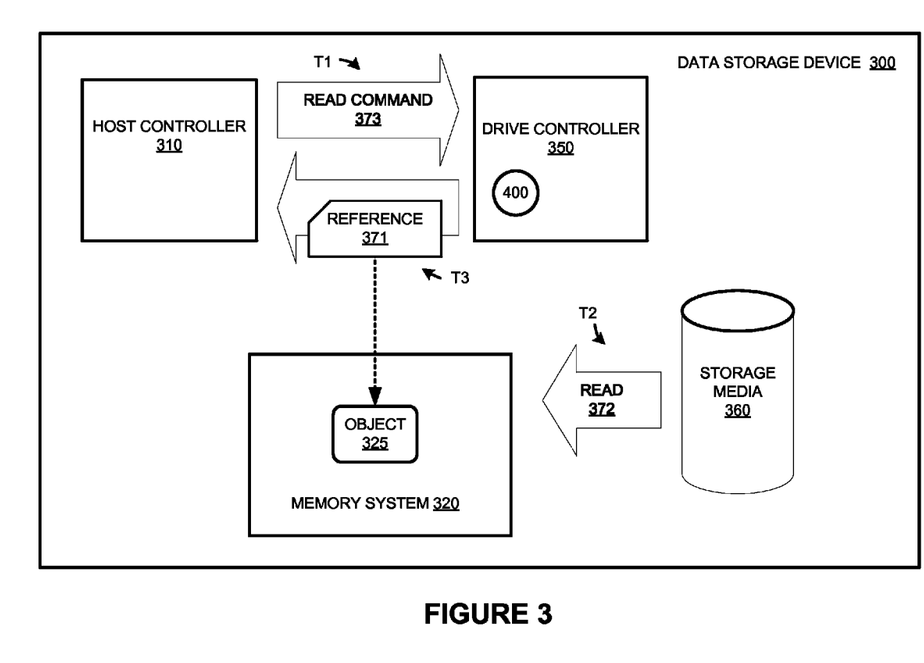
FIG. 3 illustrates a data storage device.

FIG. 3 illustrates data storage device 300 that transfers a reference of an object between controllers after reading the object from a storage media. Data storage device 300 differs in operation from data storage device 100 of FIG. 1. Data storage device 100 demonstrates an optimized data pathway for accelerating a write operation. Data storage device 300 demonstrates an optimized data pathway for accelerating a read operation. As such, data storage devices 100 and 300 demonstrate opposite storage operations and opposite data pathways through shared memory.

Data storage device 100 demonstrates a host controller that is responsible for transferring an object reference to another controller. Data storage device 300 assigns that responsibility to a drive controller instead. An implementation has flexibility as to which controllers are responsible for transferring object references to other controllers.

In particular, FIG. 3 illustrates data storage device 300 that transfers a reference of an object between controllers before writing the object to a storage media. Data storage device 300 may be deployed wirelessly, in a server rack, in a personal system, or in any hardware environment needing data storage. Data storage device 300 includes host controller 310, drive controller 350, storage media 360, and memory system 320.

Memory system 320 may be any memory unit or aggregation of units that update and retain objects as addressable data for later retrieval, such as a RAM chip, DRAM, on-chip memory, or other memory device. Host controller 310 and drive controller 350 are connected to memory system 320. Objects stored in memory system 320 are accessible by host controller 310 and drive controller 350.

Host controller 310 may be an embedded computer that executes an instance of an operating system, such as Linux. Host controller 310 may execute additional software to facilitate caching, quality of service, replication, federation, or other platform services.

Drive controller 350 may be an embedded computer that executes an instance of an RTOS. Drive controller 350 controls storage media 360. Storage media 360 may be any non-volatile online storage media, such as a magnetic or optical mechanical disk or a solid state drive.

Object 325 may be digital data, such as a byte sequence, a block, a structure, a text string, or a file. Object 325 may be application data, a record, a multimedia object, executable code, a log, or other digital data item capable of being transferred, stored, and retrieved. A software application, a physical device, manual data entry, or other means may have created object 325. So long as object 325 is not too small, object 325 may be divided into smaller data objects. Likewise, object 325 may have originally been assembled from smaller data objects.

Figure 4:
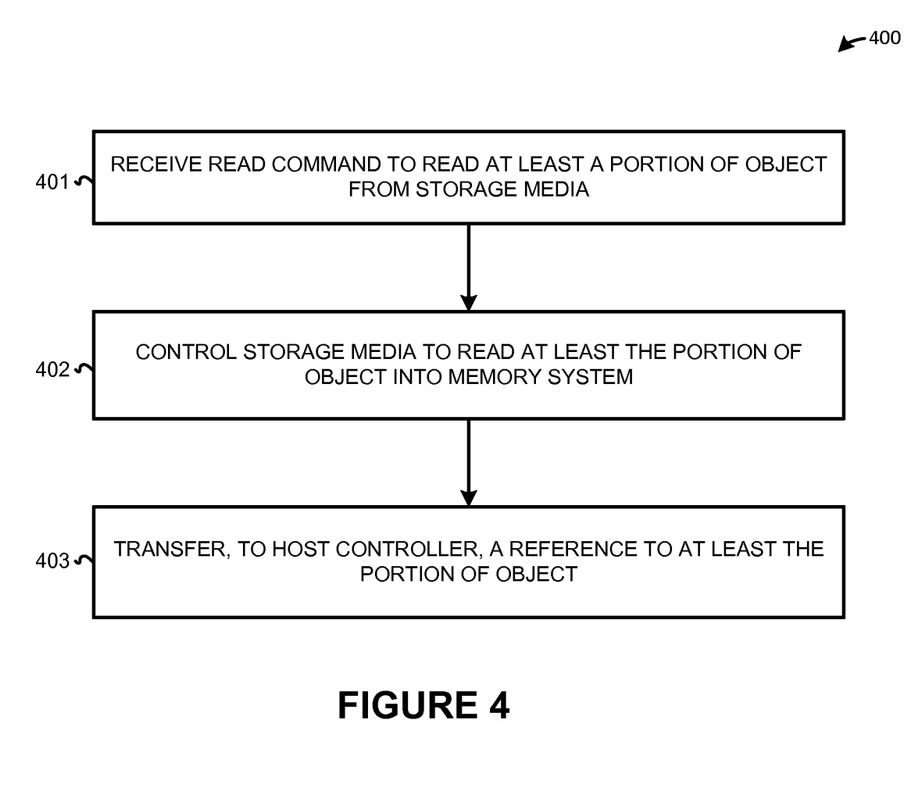
FIG. 4 illustrates a process executed by a drive controller.

To access object 325, host controller 310 transfers, at time T1, read command 373 to drive controller 350, requesting that object 325 be read. Drive controller 350 reacts to read command 373 by executing process 400. Process 400 begins by controlling storage media 360 to read at least part of object 325 into memory system 320 at time T2, shown as read 372.

Host controller 310 has reference 371 to object 325 in memory system 320. Reference 371 may be a pointer, an address, a handle, an array offset, a queue index, an associative key, or other identifier that can be dereferenced to access object 325 in memory system 320. Drive controller 350 transfers reference 371 of object 325 to host controller 310 at time T3.

FIG. 4 illustrates the sequence of steps that drive controller 350 performs while executing process 400 to read object 325 from storage media 360 and then transfer a reference of object 325 in memory system 320. Initially drive controller 350 receives (401) read command 373 to read at least a portion of object 325 from storage media 360. Drive controller 350 reacts to storage command 373 by operating (402) storage media 360 to read at least the portion of object 325 from storage media 360 into memory system 320. In fulfillment of storage command 373, drive controller 350 transfers (403), to host controller 310, reference 371 of at least the portion of object 325.

Figure 5:
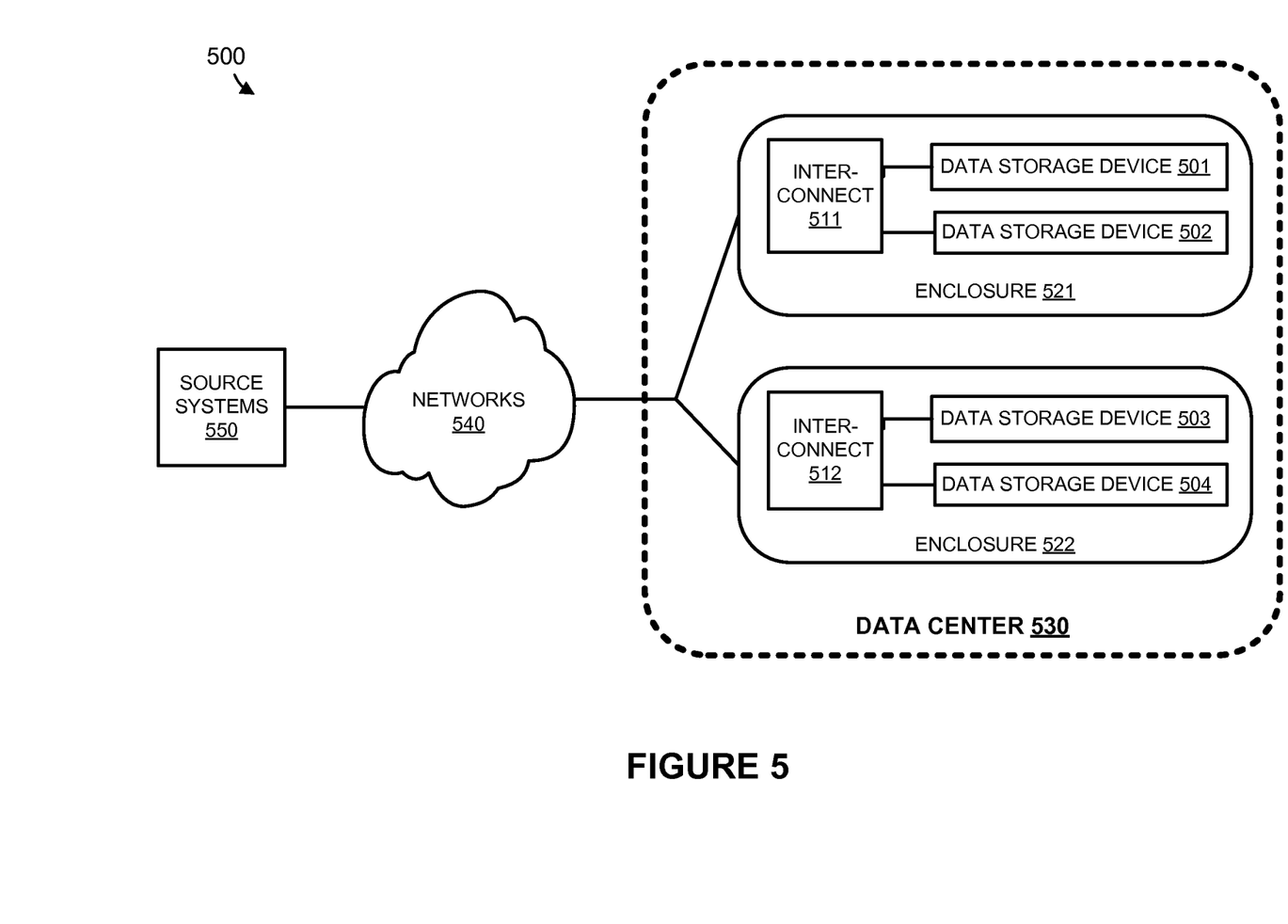
FIG. 5 illustrates a distributed storage system.

FIG. 5 illustrates distributed storage system 500 with multiple data storage devices to facilitate service quality factors such as scalability and reliability. Distributed storage system 500 includes enclosures 521-522, communication networks 540, and at least one source system 550. Source system 550 may be any data processing device capable of exchanging data with enclosures 550 over communication networks 540. Communication networks 540 is at least one network element, such as a connector, a hub, a bus, a switch, a router, a gateway, or any collection of these. Each of enclosures 521-522 may be a system rack, an electronics cabinet, or other physical structure for enclosing computer devices. Enclosures 521-522 respectively contain one of interconnects 511-512 and some number of data storage devices, such as data storage devices 501-504 as shown.

The form factor of data storage devices 501-504 may be a server, a rack card, or other packaging format. Although not shown, data storage devices 501-504 each include a host controller, a shared memory system, a storage media, and a drive controller. Data storage devices 501-504 are configured similar to data storage device 100 of FIG. 1. The host controller in each of data storage devices 501-504 executes process 200 of FIG. 2.

Data storage devices 501-502 are connected to interconnect 511. Data storage devices 503-504 are connected to interconnect 512. Each of interconnects 511-512 may be a hub, bus, switch, backplane, or other connection medium that can exchange data with data storage devices. Source systems 550 connect to interconnects 511-512 over communication networks 540. Communication networks 540 may be a single physical link, such as a wireless link or a metallic or optic link. Another implementation may achieve communication networks 540 with a collection of network equipment, such as the Internet.

Across communication networks 540, source systems 550 transfer data objects to be written to any of data storage devices 501-504. Retrieval of data objects from data storage devices 501-504, by source systems 550, also occurs over communication networks 540. Source systems 550 send storage requests. Data storage devices 501-504 send back responses to source systems 550. Data storage devices 501-504 may each contain a replica of an object, such as a file, and may each in parallel receive a request to read a different segment of the object, as with a segmented file transfer.

Figure 6:
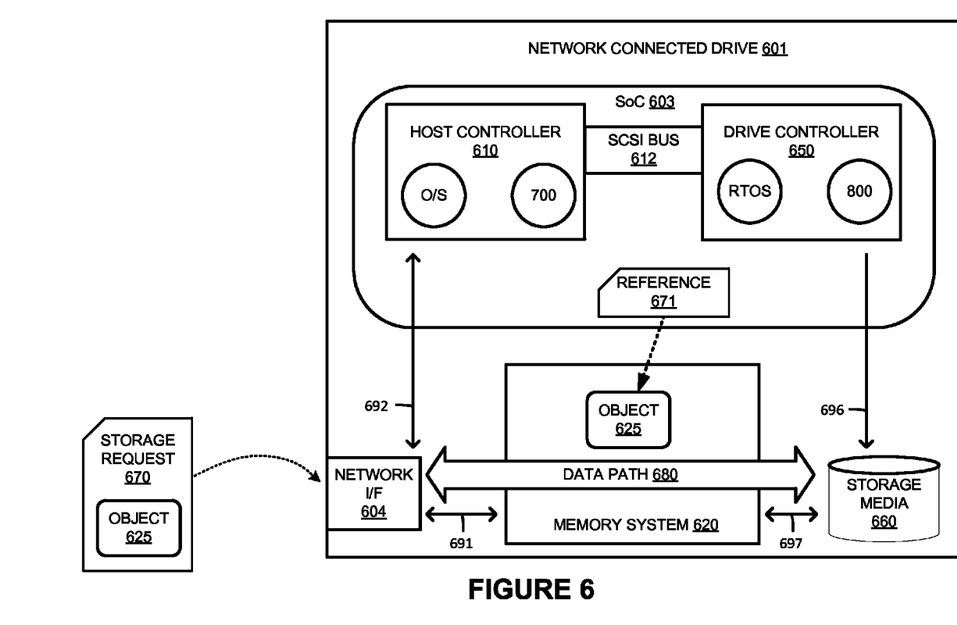
FIG. 6 illustrates a network connected drive.

FIG. 6 illustrates network connected drive 601 that uses SCSI and memory pointers to execute network storage requests. Network connected drive 601 is representative of a data storage device that internally transfers object references, such as reference 671. Network connected drive 601 may be an implementation of data storage devices 100 and 300 of FIGS. 1 and 3, although data storage devices 100 and 300 may have other implementations. Although not shown, network connected drive 601 receives storage requests over a communication network, such as a local network, the Internet, or any communication network capable of delivering storage requests from external data processing systems and responses from network connected drive 601. Network connected drive 601 includes network interface 604, memory system 620, storage media 660, and system-on-chip (SoC) 603.

SoC 603 may be a processing system on a single chip substrate, on a multi-substrate three-dimensional chip, or on multiple chips in a system-in-package. SoC 603 contains host controller 610, drive controller 650, and SCSI bus 612. SCSI bus 612 includes circuitry to operate as a proprietary SCSI interface or as a standard SCSI interface, such as parallel SCSI or serial attached SCSI. SCSI bus 612 supports at least a subset of the SCSI command protocol, including SCSI read commands, SCSI write commands, and other SCSI commands essential to SCSI operation.

Memory system 620 may be any memory unit or aggregation of units that update and retain objects as addressable data for later retrieval, such as a RAM chip, DRAM, on-chip memory, or other memory device. Host controller 610 and drive controller 650 are connected to memory system 620. Passing through memory system 620 and reaching network interface 604 and storage media 660 is data pathway 680. During operation, objects read or written by network connected drive 601 travel along data pathway 680, which avoids host controller 610 and drive controller 650.

Figure 7:
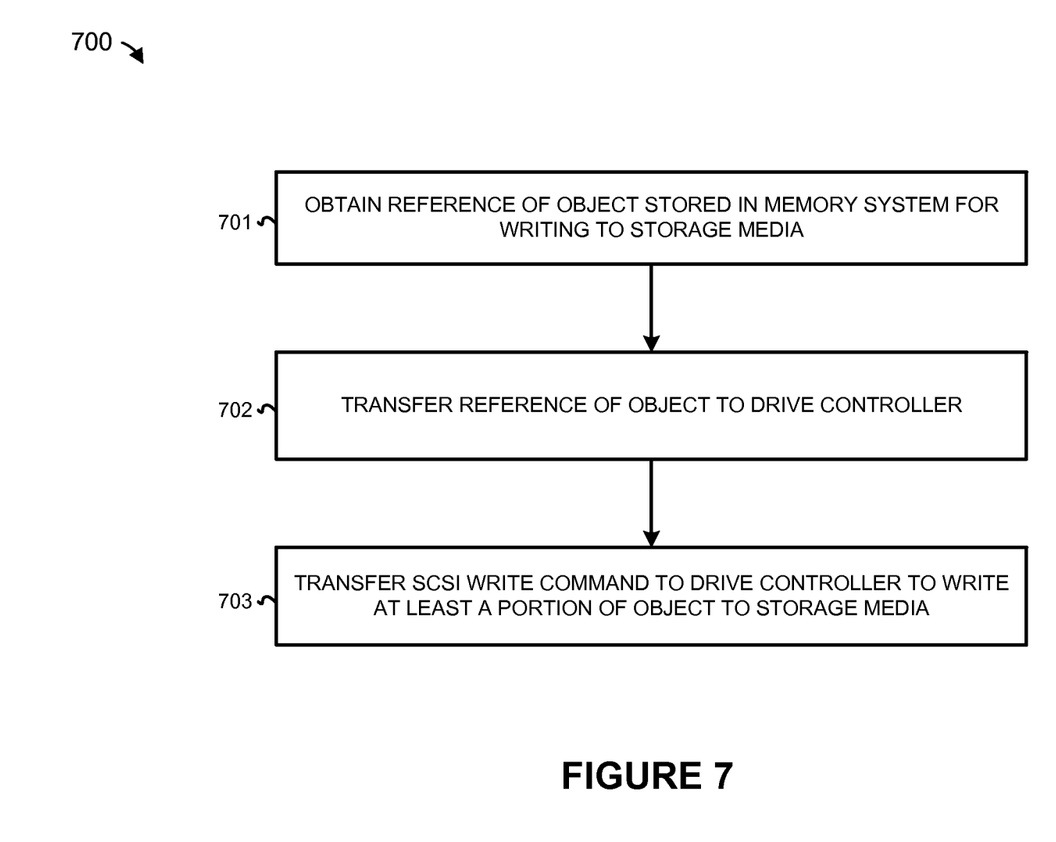
FIG. 7 illustrates a process executed by a host controller.

Host controller 610 may be an embedded computer that loads and executes host software. Host software includes the logic of process 700 and an operating system, such as Linux or a virtual operating system. Process 700 facilitates writing object 625 to storage media 660. Storage media 660 may be any non-volatile online storage media, such as a magnetic or optical mechanical disk or a solid state drive. During execution of process 700, host controller 610 issues SCSI commands on SCSI bus 612 to drive controller 650. During execution of process 700, host controller 610 transfers to drive controller 650 pointers of objects in memory system 620. In this example, a memory address is representative of a pointer of an object residing in memory system 620.

Host controller 610 receives (692) storage request 670, which may include object 625 to be written, and optionally sends back a response through network interface 604. Network interface 604 includes circuitry that functions as a physical and logical adapter of a proprietary network link protocol or a standard interface such as Ethernet, or Wi-Fi. Upon receipt of object 625, network interface 604 transfers (691) object 625 into memory system 620.

Host controller 610 may be configured to receive, from network interface 604, and process commands of distributed file system protocols, such as NFS, Swift, Ceph, or Hadoop file system, and participate in segmented file transfer. Host controller 610 may be configured to operate network connected drive 601 as a node in a distributed data store, such as a distributed database. Host controller 610 may be configured to bind network interface 604 to a virtual local area network (VLAN). Host controller 610 may be configured to operate network connected drive 601 as a node in a distributed cache.

Figure 8:
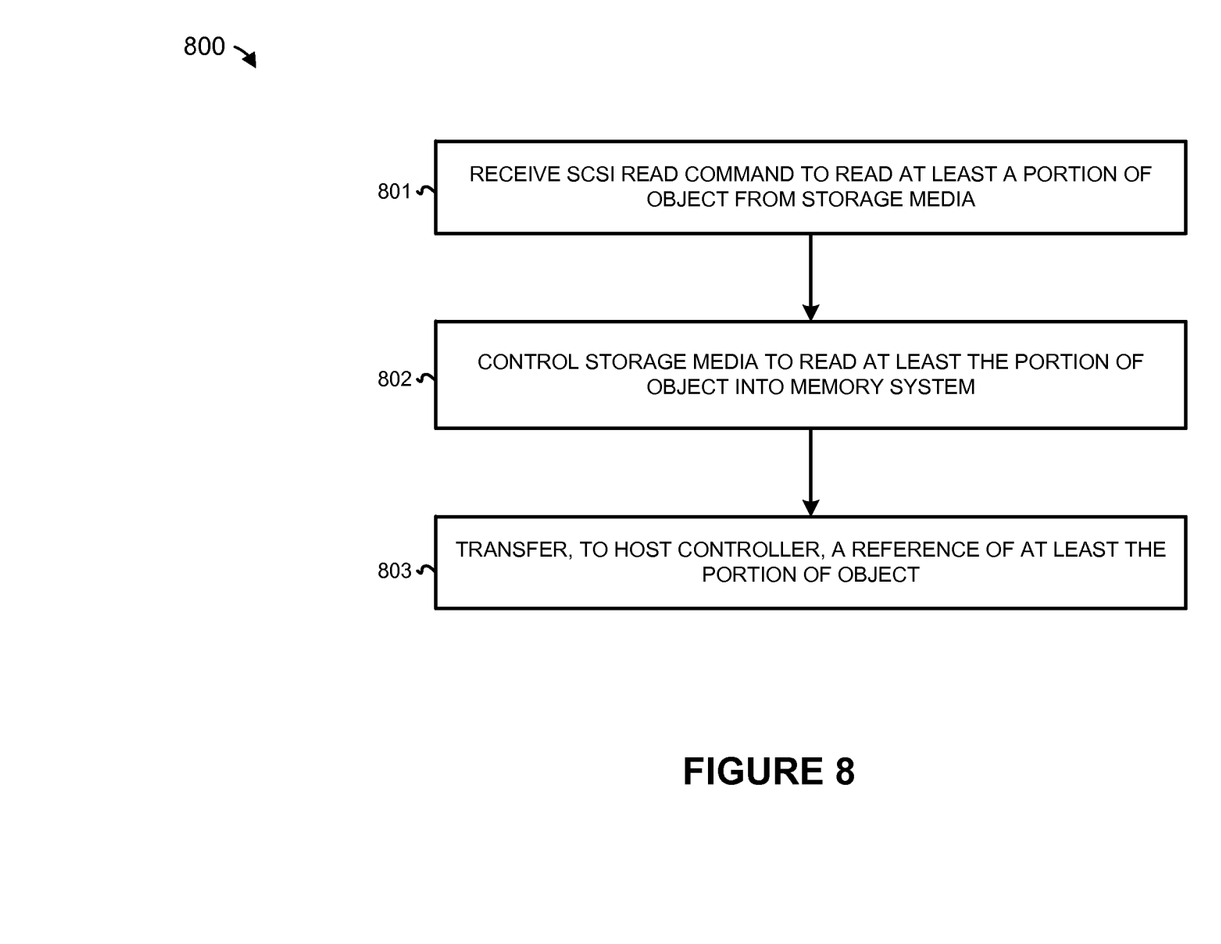
FIG. 8 illustrates a process executed by a drive controller.

Drive controller 650 may be an embedded computer that executes drive software. Drive software includes a real time operating system and the logic of process 800. Process 800 facilitates reading objects from storage media 660. During execution of process 800, drive controller 650 receives SCSI commands on SCSI bus 612 from host controller 610. During execution of process 800, drive controller 650 transfers to host controller 610 pointers of data objects read (697) from storage media 660 into in memory system 620.

FIG. 7 illustrates the sequence of steps that host controller 610 performs while executing process 700 to transfer a memory pointer of object 625 in memory system 620 and then have object 625 written to storage media 660. Initially network interface 604 receives storage request 670 and transfers object 625 into memory system 620. Network interface informs host controller 610 of storage request 670, which causes host controller 610 to execute process 700. Host controller 610 obtains (701) a memory pointer of object 625 stored in memory system 620 for writing to storage media 660. Host controller 610 transfers (702) the memory pointer of object 625 to drive controller 650.

Host controller 610 transfers (703) a SCSI write command over SCSI bus 612 to drive controller 650 to write at least a portion of object 625 to storage media 660. Host controller 610 may transfer the memory pointer of object 625 over SCSI bus 612 as SCSI data, as part of the SCSI write command header, or along a separate data path. Although not illustrated, it should be understood that step 703 might occur simultaneously or prior to step 702 in some examples.

FIG. 8 illustrates the sequence of steps that drive controller 650 performs while executing process 800 to read an object from storage media 660 and then transfer a memory pointer of the object. Initially drive controller 650 receives (801), over SCSI bus 612 from host controller 610, a SCSI read command to read at least a portion of the object from storage media 660.

Drive controller 650 reacts to the SCSI read command by operating (802) storage media 660 to read at least the portion of the object from storage media 660 into memory system 620. In fulfillment of the SCSI read command, drive controller 650 transfers (803), to host controller 610, the memory pointer of at least the portion of the object. Although host controller 610 may use the memory pointer to access the object, host controller need only transfer the memory pointer to network interface 604 and direct (692) network interface 604 to send the object.

Figure 9:
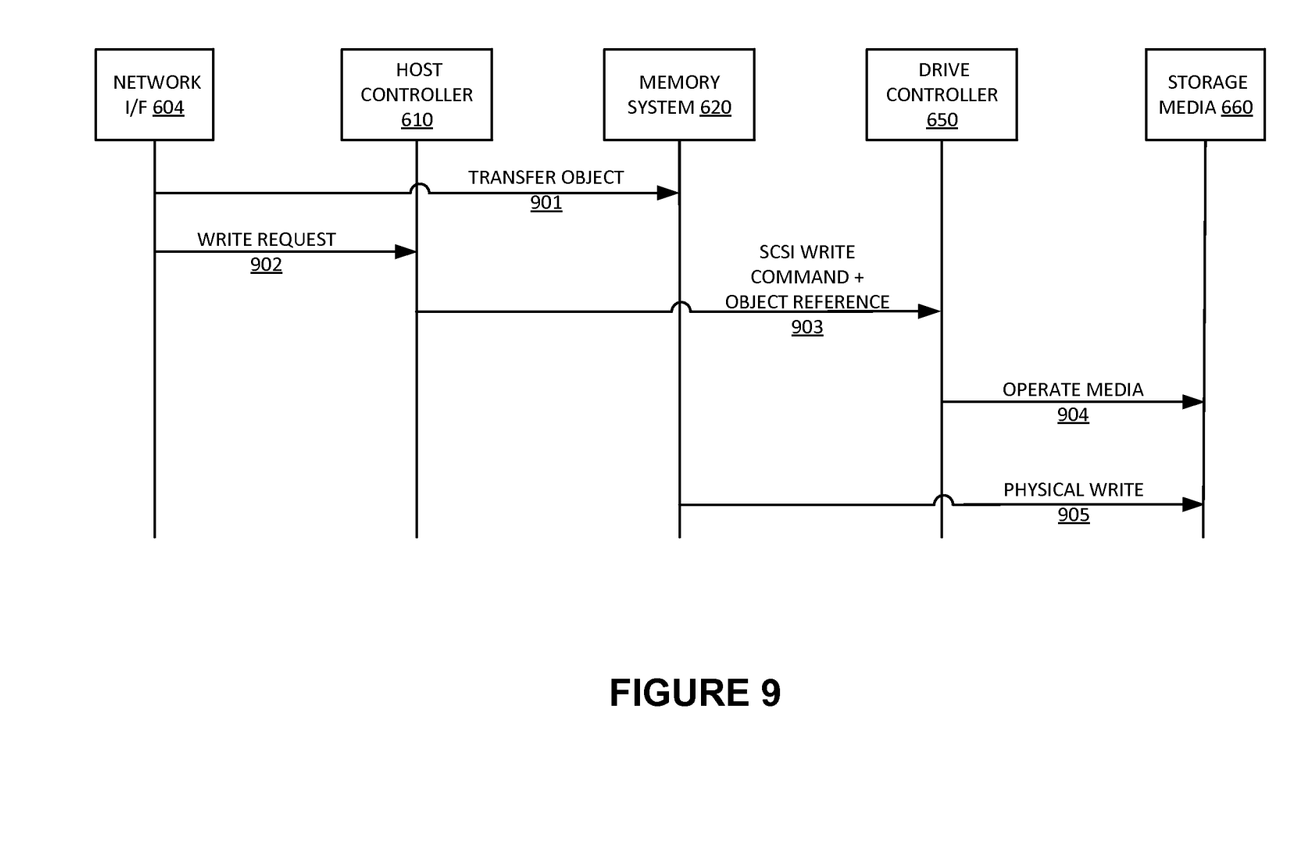
FIG. 9 illustrates a write scenario in a network storage system.

FIG. 9 illustrates the sequence of interactions that data storage device 601 performs while processing storage request 670 to write object 625. Network interface 604 receives storage request 670 and transfers (901) at least part of object 625 into memory system 620. Network interface 604 transfers a write request (902) to host control 610 of storage request 670. Host controller 610 transfers (903) a memory pointer of at least part of object 625 and, over SCSI bus 612, a SCSI write command to drive controller 650. Drive controller 650 operates (904) storage media 660 to physically write (905) at least part of object 625. Depending on the implementation of the storage media control interface, a physical write may involve direct transfer of part of object 625 from memory system 620 to storage media 660.

Figure 10:
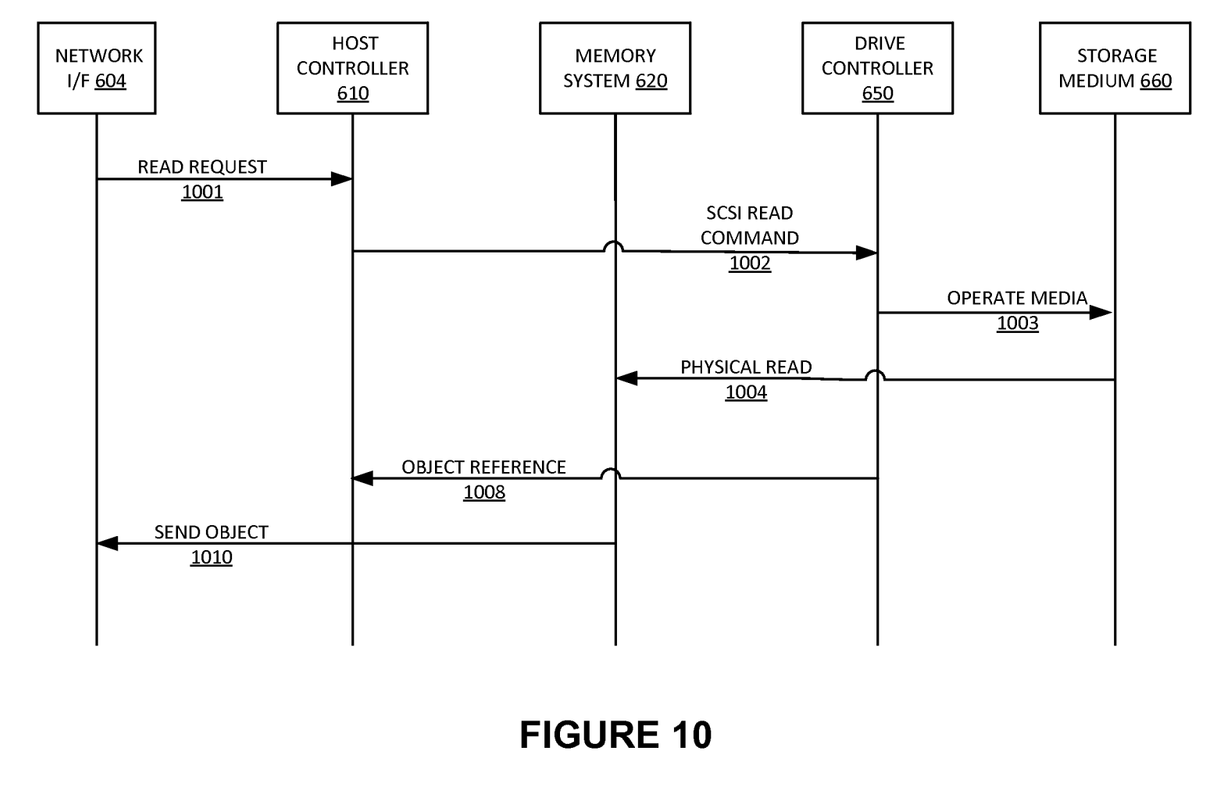
FIG. 10 illustrates a read scenario in a network storage system.

FIG. 10 illustrates the sequence of interactions that data storage device 601 performs while processing a storage request to read an object. Network interface 604 receives a storage request to read an object. Network interface informs (1001) host control 610 of the read request. Host controller 610 then transfers (1002) over SCSI bus 612 to drive controller 650, a SCSI read command to read at least a portion of the object from storage media 660. Drive controller 650 reacts to the SCSI read command by operating (1003) storage media 660 to read at least the portion of the object. Storage media 660 reads (1004) at least the portion of the object into memory system 620. In fulfillment of the SCSI read command, drive controller 650 transfers (1008), to host controller 610, a memory pointer of at least the portion of object 625. Finally host controller 610 prepares a response that includes the object that was read. When network interface 604 transmits the response, network interface 604 may send (1010) the object directly from memory system 620 across a network to another device.

Although illustrated in FIGS. 6-10 as using a SCSI bus to communicate between the host controller and the drive controller, it should be understood that this is merely illustrative and the communication bus between the host and drive controller may communicate using a variety of different communication bus formats. Such bus formats may include SATA, SAS, fibre channel, or any other similar communication protocol, including improvements thereof.

FIG. 11 illustrates software-driven data storage system 1100 that internally transfers an object reference while storing a data object. Data storage system 1100 includes data storage device 1101 and computer readable medias 1130. Computer readable medias 1130 is at least one physical data container, such as memory or other storage media. Each of computer readable medias 1130 may be a non-volatile memory, a read only memory, or an optical or magnetic disk or tape. The data on computer readable medias 1130 is not transitory. Computer readable medias 1130 does not include physical media that propagate transitory signals, such as a communication media.

Stored on computer readable medias 1130 are program instructions 1140. Program instructions 1140 may be machine instructions, bytecode, or executable text. Program instructions 1140 contain at least the logic of process 1150. Process 1150 may be an implementation of process 200 or 700 of FIGS. 2 and 7.

Data storage device 1101 may be an implementation of data storage devices 100 and 501-504 and network connected drive 601 of FIGS. 1, 5, and 6. However, data storage devices 100 and 501-504 and network connected drive 601 may have different implementations. Data storage device 1101 includes host controller 1110 and other components not shown. Host controller 1110 may be an implementation of host controllers 110 and 610 of FIGS. 1 and 6. However host controllers 110 and 610 may have different implementations.

Host controller 1110 includes processing system 1120. Processing system 1120 has sufficient circuitry and configuration to load and execute program instructions. Processing system 1120 may include one or more microprocessors, cache or other memory, one or more buses, and other processing components and circuitry.

Processing system 1120 loads and executes program instructions 1140 that encode the logic of process 1150, shown as execute 1160. Processing system 1120 uses an instruction loading mechanism that depends on the form and format of computer readable storage medias 1130. When executed by host controller 1110, program instructions 1140 direct host controller 1110 to perform process 1150 that internally transfers an object reference while storing a data object.

FIG. 12 illustrates software-driven data storage system 1200 that internally transfers an object reference while reading a data object. Data storage system 1200 differs in operation from data storage system 1100 of FIG. 11. Data storage system 1100 demonstrates software configuration for accelerating a write operation. Data storage system 1200 demonstrates software configuration for accelerating a read operation. As such data storage systems 1100 and 1200 demonstrate opposite storage operations.

Data storage system 1200 includes data storage device 1201 and computer readable medias 1230. Computer readable medias 1230 is at least one physical data container, such as memory or other storage media. Each of computer readable medias 1230 may be a non-volatile memory, a read only memory, or an optical or magnetic disk or tape. The data on computer readable medias 1230 is not transitory. Computer readable medias 1230 does not include physical media that propagate transitory signals, such as a communication media.

Stored on computer readable medias 1230 are program instructions 1240. Program instructions 1240 may be machine instructions, bytecode, or executable text. Program instructions 1240 contain at least the logic of process 1250. Process 1250 may be an implementation of process 400 or 800 of FIGS. 4 and 8.

Data storage device 1201 may be an implementation of data storage devices 300 and 501-504 and network connected drive 601 of FIGS. 3, 5, and 6. However, data storage devices 300 and 501-504 and network connected drive 601 may have different implementations. Data storage device 1201 includes drive controller 1210 and other components not shown. Drive controller 1210 may be an implementation of drive controllers 350 and 650 of FIGS. 3 and 6. However drive controllers 350 and 650 may have different implementations.

Drive controller 1210 includes processing system 1220. Processing system 1220 has sufficient circuitry and configuration to load and execute program instructions. Processing system 1220 may include one or more microprocessors, cache or other memory, one or more buses, and other processing components and circuitry.

Processing system 1220 loads and executes program instructions 1240 that encode the logic of process 1250, shown as execute 1260. Processing system 1220 uses an instruction loading mechanism that depends on the form and format of computer readable storage medias 1230. When executed by drive controller 1210, program instructions 1240 direct drive controller 1210 to perform process 1250 that internally transfers an object reference while reading a data object.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A data storage device comprising:
    a communication interface, connected to a host controller, configured to:
        receive an object;
        transfer the object to a memory system for writing to a storage medium controlled by a drive controller; and
        notify the host controller of a storage request for the object; and
    the memory system, connected to the host controller and the drive controller, wherein the host controller and the drive controller can access objects stored in the memory system;
    wherein the host controller is configured to, in response to the notification of the storage request:
        obtain a reference of the object stored in the memory system for writing to the storage medium, wherein the reference comprises a memory address for the object in the memory system; and
        transfer the reference and a storage command to the drive controller; and
    wherein the drive controller is configured to receive and process the reference and the storage command to write at least a portion of the object from the memory system to the storage medium.

2. The data storage device of claim 1 wherein the drive controller is further configured to:
    identify a read command to read at least a portion of a second object from the storage medium;
    read at least the portion of the second object from the storage medium into the memory system; and
    transfer, to the host controller, a reference of at least the portion of the second object.

3. The data storage device of claim 1 wherein the storage command comprises a small computer system interface (SCSI) write command.

4. The data storage device of claim 1 wherein:
    the host controller is configured to execute a first operating system; and
    the drive controller is configured to execute a second operating system.

5. The data storage device of claim 1 wherein the host controller, the drive controller, and the memory system are incorporated within a protective package comprising one or more integrated circuits.

6. The data storage device of claim 1 wherein the host controller, the drive controller, and the memory system are incorporated within an integrated circuit.

7. The data storage device of claim 1 wherein the communication interface comprises a network interface configured for Ethernet.

8. The data storage device of claim 1 wherein the storage medium comprises one or more hard disk drives or solid state drives.

9. One or more computer readable storage media comprising program instructions stored thereon for operating a host controller in a data storage device, wherein the program instructions, when executed by the host controller, direct the host controller to:
    receive a storage request notification from a communication interface to store an object from a memory system, wherein the object was stored in the memory system by the communication interface, and wherein the host controller and a drive controller can access objects stored in the memory system; and in response to the storage request notification:
    identify a reference of the object stored in the memory system for writing to a storage medium controlled by the drive controller, wherein the reference comprises a memory address for the object in the memory system; and
    transfer, to the drive controller, the reference and a storage command to write at least a portion of the object to the storage medium from the memory system.

10. The one or more computer readable storage media of claim 9 wherein the storage medium controlled by the drive controller comprises one or more hard disk drives or solid state drives.

11. The one or more computer readable storage media of claim 9 wherein the storage command comprises a small computer system interface (SCSI) write command.

12. The one or more computer readable storage media of claim 9 wherein the program instructions further direct the host controller to execute an operating system instance.

13. The one or more computer readable storage media of claim 9 wherein the communication interface comprises a network interface configured for Ethernet.

14. A computing apparatus comprising:
    one or more computer readable storage media;
    a processing system operatively coupled with the one or more computer readable storage media; and
    program instructions stored on the one or more computer readable storage media to operate a host controller in a data storage device that, when read and executed by the processing system, direct the processing system to at least:
    receive a storage request notification from a communication interface to store an object from a memory system, wherein the object was stored in the memory system by the communication interface, and wherein the host controller and a drive controller can access objects stored in the memory system;
    identify a reference of the object stored in the memory system for writing to a storage medium controlled by the drive controller, wherein the reference comprises a memory address for the object in the memory system; and
    transfer, to the drive controller, the reference and a storage command to write at least a portion of the object to the storage medium from the memory system.

15. The computing apparatus of claim 14 wherein the storage medium controlled by the drive controller comprises one or more hard disk drives or solid state drives.

16. The computing apparatus of claim 14 wherein the communication interface comprises a network interface configured for Ethernet.

17. The computing apparatus of claim 14 wherein the storage command comprises a small computer system interface (SCSI) write command.

18. The computing apparatus of claim 14 wherein the memory system comprises random access memory.

* * * * *